Sept. 24, 1963      F. W. FORK      3,104,737

HANGER ASSEMBLY

Filed Aug. 23, 1960

INVENTOR.
FRANK W. FORK
BY
*Harry B. Keck*
ATTORNEY

United States Patent Office 3,104,737
Patented Sept. 24, 1963

3,104,737
HANGER ASSEMBLY
Frank W. Fork, Pittsburgh, Pa., assignor to
H. H. Robertson Company
Filed Aug. 23, 1960, Ser. No. 51,347
1 Claim. (Cl. 189—36)

This invention relates to a hanger assembly for use in securing a hanger rod to support strip or bracket. More particularly this invention relates to a hanger assembly which is particularly useful in combination with metal cellular flooring having a plurality of punched-out strips formed therein to serve as support strips.

A recent improvement of suspending means in metal cellular flooring is described in co-pending application titled "Improved Cellular Floor Construction," Serial Number 35,976, filed June 14, 1960 and assigned to the assignee of the present invention. In brief the improvement comprises a plurality of punched-out strips in the bottom element of the metal cellular flooring. These strips depend below the surface of the bottom element and provide a clear opening therebetween which serves as a supporting bracket. Ductwork and conduits for heating and ventilating, mechanical piping, electrical conduits and fixtures and telephone equipment may be suspended from the punched-out strips.

It is in the area of suspending telephone equipment from these strips wherein the present invention finds its greatest utility. Telephone equipment such as relay equipment and junction boxes require a substantially rigid suspension because of the delicate nature of their internal components. Relay equipment, for example, has contact switches which might click on-and-off should the mounting box be jarred or caused to vibrate. Such undesirable on-and-off motion would of course disturb the telephone system.

The present invention provides the substantially rigid suspension required by this equipment. However, it is not so rigid that vibrations in a building, caused by seismic disturbances, for instance, will be transferred to the suspended equipment. The equipment's inertia is sufficient to hold it steady while the hanger assembly of the present invention absorbs the vibrations.

It is thus the primary object of this invention to provide a hanger assembly that is substantially rigid when installed.

Another object of this invention is to provide a hanger assembly that is composed of a minimum number of parts.

Still another object of this invention is to provide a hanger assembly that is quickly and easily installed or removed.

These and other objects and advantages of the present invention will become apparent from the following detailed description by reference to the accompanying drawings in which.

Figure 1:
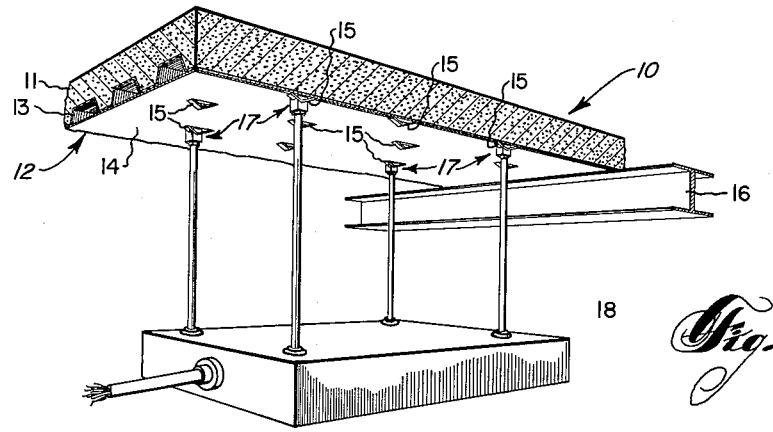
FIGURE 1 is a fragmentary perspective view of a building floor having supporting strips formed in its plane lower element and illustrating the suspension of a junction box by use of the hanger assembly of the present invention.

Reference is now directed to FIGURE 1 wherein one environment of the present invention is illustrated. A building floor 10 is shown comprising a layer of concrete 11 and a metal cellular flooring 12. The flooring 12 includes an upper corrugated element 13 and a lower plane element 14 secured thereto. The plane element 14 has a plurality of punched-out strips 15 depending therefrom which serve as supporting strips. The floor 10 is supported at key points by steel framework of which I-beam 16 is typical.

A hanger assembly 17 of the present invention is shown attached to each of four punched-out strips 15. A mounting box such as junction box 18, for example, is suspended by means of the hanger assemblies 17.

Figure 2:
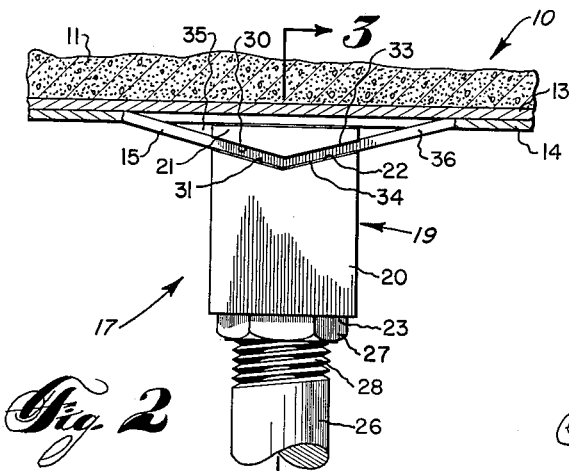
FIGURE 2 is a fragmentary elevation view, partly in cross-section, illustrating the preferred embodiment of the present hanger assembly.
Figure 3:
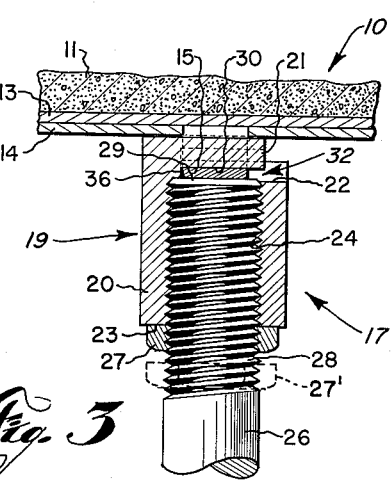
FIGURE 3 is a fragmentary elevation view, partly in cross-section, taken along the line 3—3 of FIGURE 2 further illustrating the preferred embodiment of the present invention.

The hanger assembly 17 of the present invention is more fully illustrated in FIGURES 2 and 3. The hanger assembly 17 comprises an adapter member 19 which includes an elongated body portion 20 and an L-shaped finger 21. The elongated body portion 20 includes a first end 22 and a second end 23. The L-shaped finger 21 extends beyond the first end 22 of the body 20. The elongated body 20 further includes a longitudinal threaded bore 24.

The hanger assembly 17 further includes a hanger rod 26 and a locking nut 27. The hanger rod 26 has a threaded end 28 which engages the bore 24 and a substantially flat end portion 29 transversely of the hanger rod 26.

The L-shaped finger 21 has a V-shaped surface 30 positioned opposite the first end 22. The first end 22 has a trough-shaped surface 31 which is spaced from the V-shaped surface 30 thereby forming a slot 32.

Figure 4:
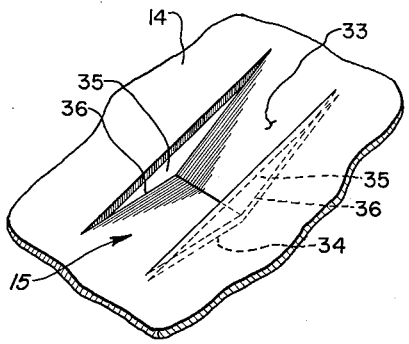
FIGURE 4 is a framentary isometric view illustrating the construction of the punched-out strips.

As previously indicated the punched-out strips 15 serve as supporting brackets to suspend equipment, such as the junction box 18 (FIGURE 1), from the floor 10. Each strip 15 has the configuration best illustrated in FIGURE 4. The strip 15 is formed by depressing or punching out a strip 15 from the lower element 14 of the metal cellular flooring 12. The strip 15 has an upper surface 33 and a lower surface 34. Further the strip 15 provides a pair of elongated openings 35 formed by the upper surface 33 and the element 14. The strip 15 also includes a pair of side edges 36.

Referring back to FIGURES 2 and 3, the V-shaped surface 30 and the trough-shaped surface 31 have substantially the same shape as the strip 15. Further the V-shaped surface 30 is spaced from the trough-shaped surface 31 so that the slot 32 formed thereby is sufficiently wide to receive the strip 15 therein.

To install the hanger assembly 17 the locking nut 27 is threaded onto the hanger rod 26 to the posiiton shown in phantom outline (FIGURE 3) and indicated by the numeral 27'. The hanger rod 26 is then threaded into the bore 24 of the adapter member 19 about three-quarters of the way in. The L-shaped finger 21 is then passed through one of the elongated openings 35 of the supporting strips 15 until one of the side edges 36 abuts the finger 21 as shown in FIGURE 3.

The hanger rod 26 is then turned in until the flat end portion 29 abuts the lower surface 34 of the strip 15. Further forceful turning of the hanger rod 26 will serve to frictionally clamp the strip 15 between the V-shaped surface 30 and the flat end portion 29 of the hanger rod 26 thus securing the hanger assembly 17 to the strip 15. In order to lock the hanger assembly 17 in its secured position the locking nut 27 is threaded forcefully against the second end 23 of the elongated body portion 20.

Thus in a very quick and easy manner the hanger assembly 17 is secured to the strip 15 providing a substantially rigid suspension. Attachment of equipment to the other end of the hanger rod 26 is now possible by any convenient means (not specifically shown).

Figure 5:
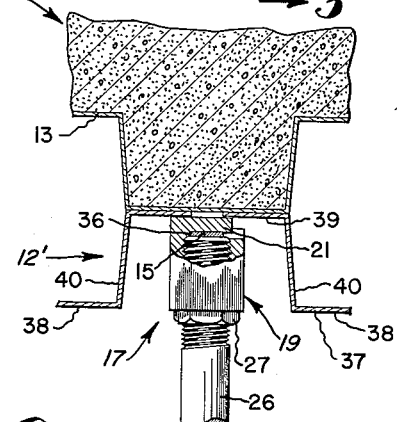
FIGURE 5 is a fragmentary cross-sectional view of a building floor having a corrugated lower element and illustrating the adaptation of the present hanger assembly.

Reference is now directed to FIGURE 5 wherein the hanger assembly 17 is illustrated in combination with a floor 10' having a metal cellular flooring 12'. In this instance the metal cellular flooring 12' has a lower corrugated element 37 which may be similar to the upper element 13. The lower element 37 has lower walls 38, upper walls 39 (wherein the strips 15 are formed) and substantially vertical side walls 40. A pair of side walls 40 together with the upper wall 39 define a channel. As illustrated the hanger assembly 17 is adaptable to the metal cellular flooring 12'. The distance between the side wall 40 and the side 36 of the strip 15 must be greater than the length of the L-shaped finger 21 to allow for installation.

If desired the L-shaped finger 21 could be canted with respect to the elongated body 20 thereby sloping the hanger rod 26 with respect to the metal cellular flooring 12. This construction may be employed wherein the spacing of the supporting strips 15 and the dimensions of the suspended box are such that the hanger assembly 17 may not be conveniently used.

The elongated body portion 20 preferably is formed from metals, for example, cast iron or steel. Such construction provides a direct electrical grounding between a suspended box and the cellular metal flooring.

From the foregoing description it should be apparent that the present invention provides a substantially rigid hanger assembly.

The present invention also provides a hanger assembly that is composed of a minimum number of parts and which is quickly and easily installed or removed.

According to the provisions of the patent statutes, I have explained the principle, preferred construction and mode of operation of my invention and have illustrated and described what I now consider to represent its best embodiment. However, I desire to have it understood that within the scope of the appended claim, the invention may be practiced otherwise than as specifically illustrated and described.

I claim:

The combination of a support strip and a two-piece hanger assembly comprising an adapter member and a hanger rod, said adapter member comprising an elongated body having a pair of ends and a threaded bore extending longitudinally therethrough, said elongated body further having an L-shaped finger extending from a first end of said pair of ends, said first end being entirely below said L-shaped finger, said L-shaped finger having a face disposed opposite to the said bore, said face being adapted to engage the upper surface of the said support strip, said L-shaped finger and the said threaded bore being wider than the said support strip, said hanger rod having a threaded end engaged in the said threaded bore whereby the said support strip may be clamped between the said face of the said L-shaped finger and the end of the said hanger rod.

References Cited in the file of this patent

UNITED STATES PATENTS

| 2,121,144 | Fischer | June 21, 1938 |
| 2,529,153 | Hain | Nov. 7, 1950 |
| 2,963,251 | Fuss | Dec. 6, 1960 |

FOREIGN PATENTS

| 480,452 | Canada | Jan. 22, 1952 |